US012675943B2

(12) United States Patent
Altan

(10) Patent No.: US 12,675,943 B2
(45) Date of Patent: Jul. 7, 2026

(54) DIFFERENCE MATTING UTILISING VIDEOWALL

(71) Applicant: ZERODENSITY YAZILIM ANONIM SIRKETI, Izmir (TR)

(72) Inventor: Kuban Altan, Izmir (TR)

(73) Assignee: ZERODENSITY YAZILIM ANONIM SIRKETI, Izmir (TR)

( * ) Notice: Subject to any disclaimer, the term of this patent is extended or adjusted under 35 U.S.C. 154(b) by 118 days.

(21) Appl. No.: 18/696,364

(22) PCT Filed: Oct. 18, 2021

(86) PCT No.: PCT/TR2021/051057
§ 371 (c)(1),
(2) Date: Mar. 28, 2024

(87) PCT Pub. No.: WO2023/055311
PCT Pub. Date: Apr. 6, 2023

(65) Prior Publication Data
US 2025/0124646 A1 Apr. 17, 2025

(51) Int. Cl.
*G06T 15/20* (2011.01)
*G06T 5/73* (2024.01)
*G06T 7/80* (2017.01)
*G06T 19/00* (2011.01)
*H04N 5/272* (2006.01)

(52) U.S. Cl.
CPC .............. *G06T 15/205* (2013.01); *G06T 5/73* (2024.01); *G06T 7/80* (2017.01); *G06T 19/00* (2013.01); *H04N 5/272* (2013.01)

(58) Field of Classification Search
None
See application file for complete search history.

(56) References Cited

U.S. PATENT DOCUMENTS

| | | | |
|---|---|---|---|
| 9,779,538 B2 | 10/2017 | Sanders et al. | |
| 2010/0097443 A1 | 4/2010 | Lablans | |
| 2020/0145644 A1* | 5/2020 | Cordes | .................... G06T 15/50 |

(Continued)

FOREIGN PATENT DOCUMENTS

| | | |
|---|---|---|
| EP | 1103920 A2 | 5/2001 |
| JP | 2019047431 A | 3/2019 |

(Continued)

*Primary Examiner* — Michael J Cobb
(74) *Attorney, Agent, or Firm* — Bayramoglu Law Offices LLC

(57) ABSTRACT

An image processing method is carried out by a processor unit configured to input the first image from the camera to determine the portions to be masked in a first image comprising at least one object in front of a video wall display in which a displayed background image is shown and a captured background image of the displayed background image being captured by the camera. Accordingly, the method comprises the steps of determining a camera position and a camera point of view from which the camera receives the first image, accessing a background image that is the source of the displayed background image shown on the video wall display when the camera receives the first image, and creating an edited background image by editing the accessed background image according to a video wall display position information recorded in a memory unit.

10 Claims, 5 Drawing Sheets

(56) References Cited

U.S. PATENT DOCUMENTS

| | | | |
|---|---|---|---|
| 2020/0309898 A1 | 10/2020 | Boutaud | |
| 2022/0068313 A1* | 3/2022 | Shafir Nir | G06V 20/48 |
| 2022/0280857 A1* | 9/2022 | Watterson | H04N 5/2228 |
| 2022/0343562 A1* | 10/2022 | Hirschfield | G06T 11/001 |
| 2024/0259518 A1* | 8/2024 | Yamanishi | G06T 5/50 |

FOREIGN PATENT DOCUMENTS

| | | | |
|---|---|---|---|
| WO | 2005099423 A2 | 10/2005 | |
| WO | 2008109567 A2 | 9/2008 | |

* cited by examiner

DIFFERENCE MATTING UTILISING VIDEOWALL

CROSS REFERENCE TO RELATED APPLICATIONS

This application is a national stage entry of International Application No. PCT/TR2021/051057, filed on Oct. 18, 2021, which is based upon and claims foreign priority to Turkey Patent Application No. 2021/015163, filed on Sep. 28, 2021, the entire contents of which are incorporated herein by reference.

TECHNICAL FIELD

The invention relates to an image processing method carried out by a processor unit configured to input the image captured by said camera to distinguish portions to be masked in a first image comprising at least one object in front of a video wall display in which a background image captured by a camera is shown, and a system implementing this method.

BACKGROUND

Studio systems comprising an object and a video wall screen surrounding the object are known in the art. Images expressing the environment that is intended to be behind the object are displayed on the screens, and the image of the object in a 3D environment is created by changing it according to the camera point of view in these systems.

There is a system that includes the video wall screen, which covers the environment to be shot and shows the image of a 3D virtual environment, where, according to the viewing angle of video wall screen from a camera, the virtual environment displayed on the video wall is changed according to the expected angle when viewed from the camera and the images on the video wall screen are edited accordingly in the US application numbered U.S. Pat. No. 9,779,538B2.

Video wall screens include LED screen or screens of a specific height provided to cover the shooting environment. The edges and the portions of the screen that exceed the edges must be combined with the complementary image in a way that complements the image on the screen when shooting with the camera point of view exceeding the top edge or side edges of the video wall screen. However, this combination process does not give 100% accurate results. The reason for this is that the moire problems on the screen, color changes caused by angle of view, reflections and glare on the video wall, and deformations affecting the image in the optical path of the camera cannot be exactly matched. Due to these differences, almost all of the image on the video wall needs to be replaced with the virtual graphic by masking the objects in front (actors and other stage decorations) with methods that require human intervention in a fully non-automatic way in order to hide the transition between the graphic and the image from the video camera. This process causes long efforts and cost after shooting. The use of a video wall screen with a larger surface also greatly increases the cost. These errors can be corrected with subsequent operations; however, this prevents the acquisition of live images.

As a result, all the problems mentioned above have made it necessary to make an innovation in the related technical field.

SUMMARY

The present invention relates to a method and system in order to eliminate the above-mentioned disadvantages and to bring new advantages to the related technical field.

An object of the invention is to provide a system and method that enables the image formed when the camera point of view exceeds the limits of the screen to be completed in an easy manner in the shots taken in front of the video wall screens.

It is possible to use video wall in the reduced area in the sets in this way.

The present invention is an image processing method carried out by a processor unit configured to input the image captured by said camera to distinguish the portions to be masked in a first image comprising at least one object in front of a video wall display in which a background image captured by a camera is shown, in order to realize all the objects that are mentioned above and will arise from the the following detailed description. Accordingly, its novelty comprises the following steps;

- determining a camera position and a camera point of view from which the camera receives said first image,
- determining the background image shown on said video wall screen when the camera receives the first image and accessing the determined background image,
- creating an edited background image by editing the accessed background image according to a video wall display position information recorded in a memory unit, said camera position and said camera point of view and making it as viewed by the camera,
- determining the portions to be masked in the first image using the differences between the first image and said edited background image.

Thus, it allows to perform difference keying on video wall screens. The pixels outside the objects in front of the video wall screen are automatically replaced with a completely virtual graphic in the image from the video camera thanks to the difference keying. It is possible to reduce the costs by allowing the use of video wall screen in the reduced area in this way. In addition, images are obtained in real-time. Another benefit of the invention is that it allows taking images as if there is a green background in the portions where the video wall screen is not sufficient. The invention also eliminates the moire effect.

A possible embodiment of the invention is characterized in that it comprises the following steps; determining the camera parameters with which the camera receives the first image prior to the step of determining the portions to be masked,

- editing the edited background image according to said parameters, by rendering the accessed background as if it was sensed from the sensor of camera. Thus, improved difference keying is provided.

Another possible embodiment of the invention is characterized in that said camera parameters are lens view angle, lens focal length, lens type, lens deformation information.

A possible embodiment of the invention is characterized in that it creates an edited image according to the distance of each pixel in the accessed background image from the camera in the step of "creating an edited background image by editing the accessed background image according to a video wall display position information recorded in a memory unit, said camera position and said camera point of view and making it as viewed by the camera".

A possible embodiment of the invention is characterized in that said background image may also include images in the form of a linear video content.

The invention is also a system comprising a processor unit configured to input the image captured by said camera to distinguish the portions to be masked in a first image comprising at least one object in front of a video wall in which a background image is shown. Accordingly, its novelty lies in that it comprises a position monitoring device configured to send a point of view and a position information of said camera to the processor unit; said processor unit is configured to perform the following steps;

determining a camera position and a camera point of view from which the camera receives said first image, determining the background image shown on said video wall screen when the camera receives the first image and accessing the determined background image, creating an edited background image by editing the accessed background image according to a predetermined position of video wall display, said camera position and said camera point of view to simulate the state in which it is captured by the camera, determining the portions to be masked using the first image with the help of the edited background image.

A possible embodiment of the invention is characterized in that the processor unit is configured to perform the following steps;

determining the camera parameters with which the camera receives the first image, editing the accessed background image according to said camera parameters to ensure that the accessed background image can be simulated in the state in which it is captured by the camera.

A possible embodiment of the invention is characterized in that said camera parameters are at least one of lens zoom state, the filter used, lens focus state, lens type, lens dimensions.

A possible embodiment of the invention is characterized in that the processor unit is configured to create an edited image according to the distance of each pixel in the accessed background image from the camera in the step of "creating an edited background image by editing the accessed background image according to a predetermined position of video wall display, said camera position and said camera point of view to simulate the state in which the accessed background image is captured by the camera".

BRIEF DESCRIPTION OF THE DRAWINGS

A representative view of the system is given in FIG. 1.

A representative view of the system in which the camera point of view exceeds the video wall screen is given in FIG. 2.

Figure 3:
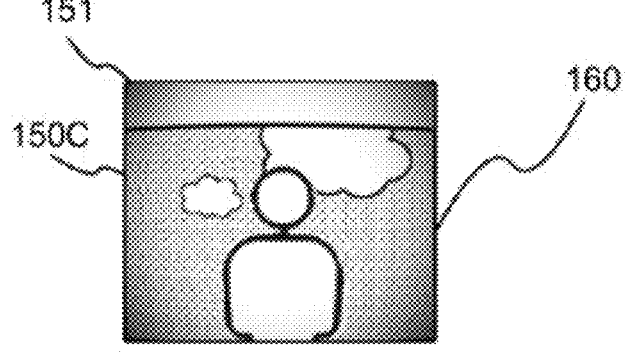

A representative view of the first image is given in FIG. 3.

Figure 4:
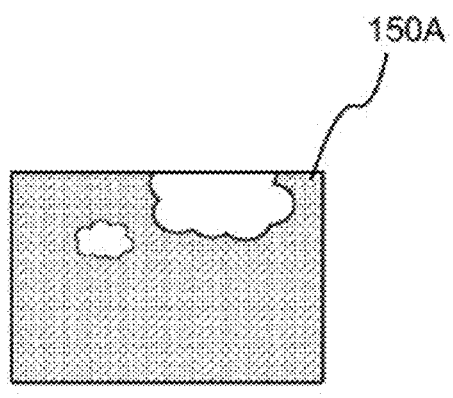

A representative view of the background image is given in FIG. 4.

Figure 5:
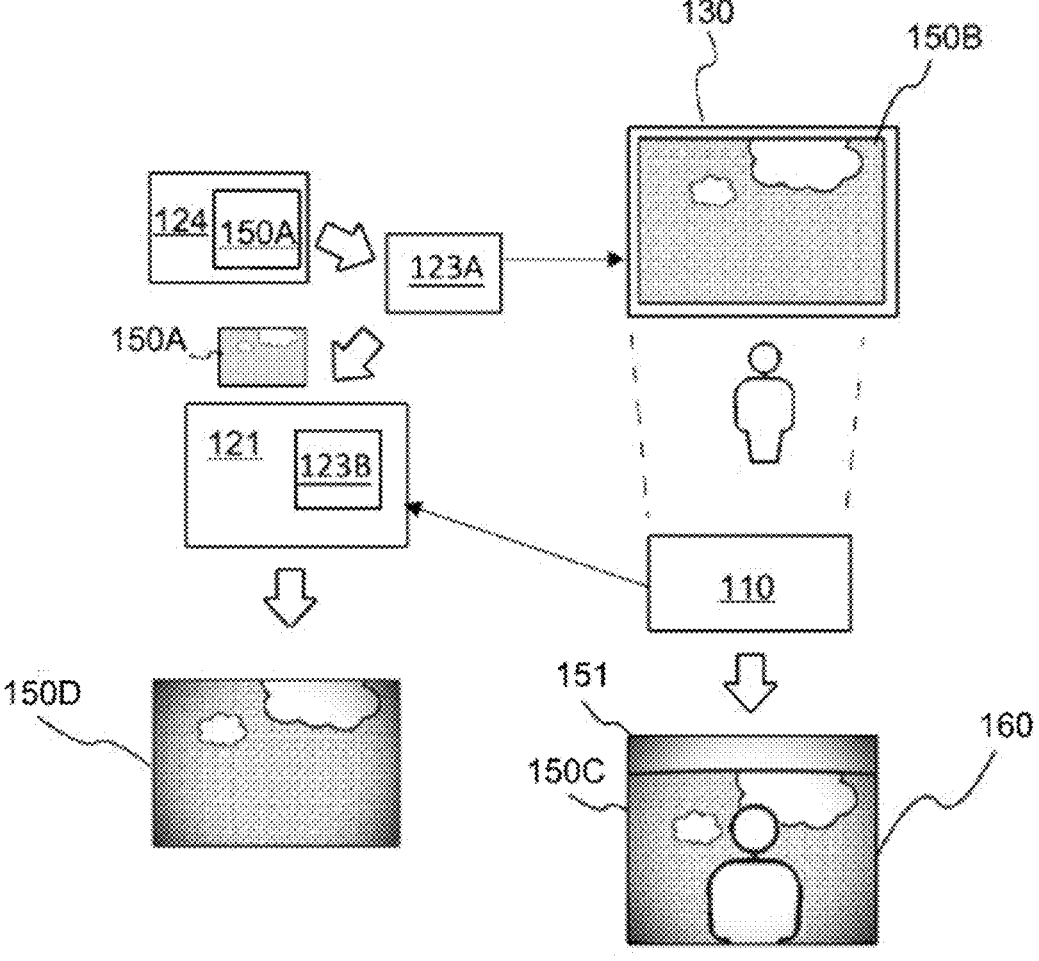

A representative view of the acquisition of the edited background image is given in FIG. 5.

Figure 6:
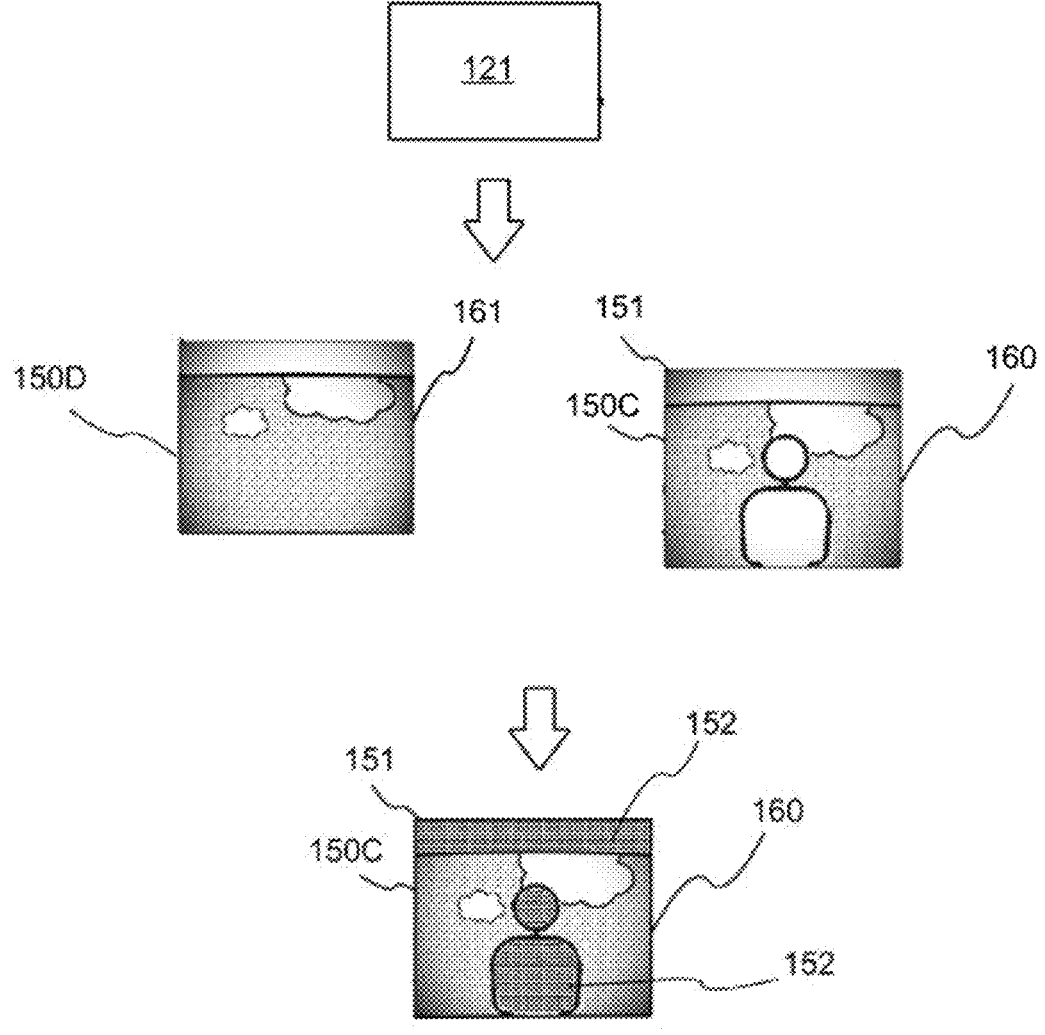

A representative view of the detection of the portions to be masked using the edited background image in the first image is given in FIG. 6.

Figure 7:
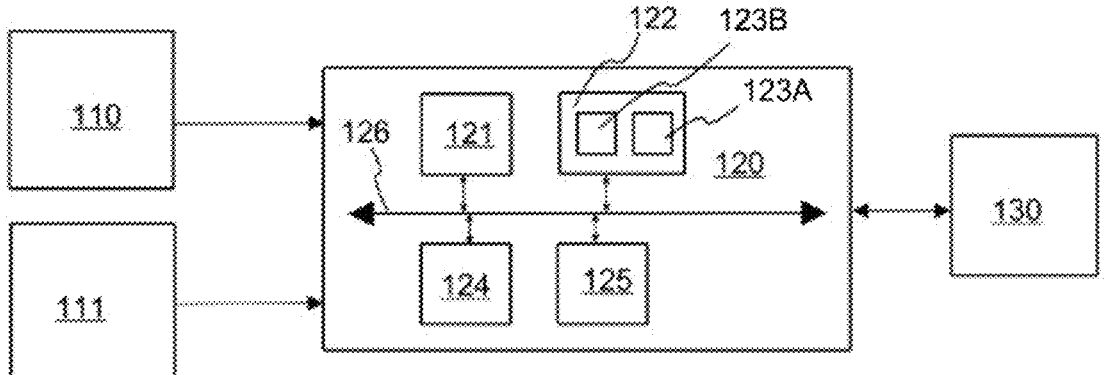

A schematic view of the system is given in FIG. 7.

REFERENCE NUMBERS GIVEN IN THE FIGS

110 Camera
111 Position tracking device

4

120 Image processing unit
121 Processor unit
122 Memory unit
123A Image rendering software
123B Image processing software
124 Image memory
125 Input-output unit
126 Bus
130 Video wall display
140 Object
150A Background image
150B Displayed background image
150C Captured background image
150D Edited background image
151 Unwanted portion
152 Portion to be masked
160 First image
161 Second image

DETAILED DESCRIPTION OF THE EMBODIMENTS

The subject of the invention is explained with examples that do not have any limiting effect and provided only for a better understanding of the subject in this detailed description.

Figure 1:
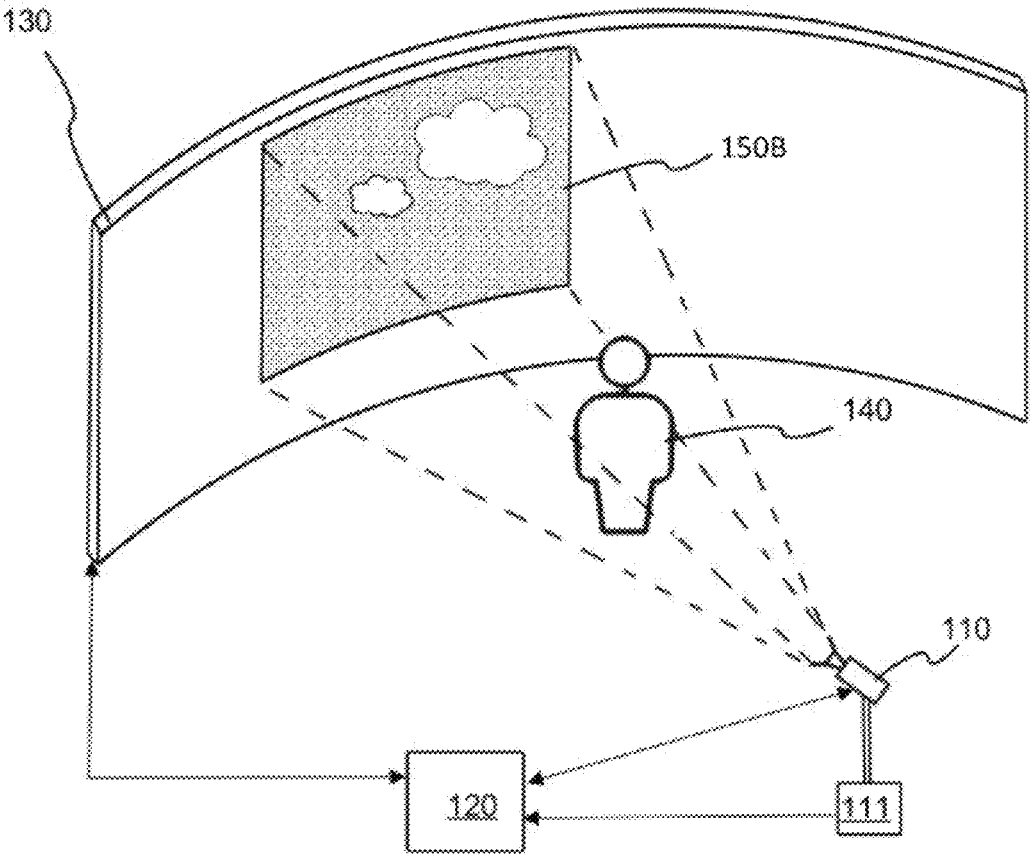

FIG. 1 illustrates a video wall display (130). The video wall display (130) is a studio assembly that allows a 3D environment to be viewed from a camera (110) point of view, in such a way that the display is displayed in the field of view of the camera (110). Video wall screens (130) may include an LED screen or screens. It is provided in a straight, L-shaped, C-shaped or O-shaped form that rises linearly from the ground and covers the horizontal shooting environment. This image stored in a memory and to be displayed on the video wall display (130) is defined as the background image (150A). Said background image (150A) shown on the video wall display (130) is defined as a displayed background image (150B).

For instance, let the background image (150A) be an image that expresses a 3D desert environment. When the perspective of the camera (110) changes, the background image (150A) is also changed as the desert environment behind the actors and the decorations also changes according to the changing perspective. Changing the background image can be carried out according to the perspective of the camera, and the camera perspective can be followed by the systems known in the art that follow the position and point of view of the camera.

An image processing unit (120) is provided. The image processing unit (120) includes a processor unit (121). Said processor unit (121) operates by executing image rendering software (123A) consisting of command lines stored in a memory unit (122). Said processor unit (121) may include a GPU, a CPU, or appropriate combinations thereof. The memory unit (122) may include appropriate combinations of the types of memories that enable the data to be stored temporarily/permanently.

The image memory (124) is also a type of memory that can store data permanently and/or temporarily. It may be part of the memory unit (122) in a possible embodiment. The image memory (124) stores the background images (150A).

The image processing unit (120) may also include an input/output unit (125). The input-output unit (125) may include hardware that enables the image processing unit (120) to exchange data with external devices such as keyboards, mice, or other computers. The image processing unit (120) includes the processor unit (121), the memory unit (122), the image memory (124), the input/output unit, and a bus (126) for data exchange of other electronic components known in the art but not mentioned here.

The image processing unit (120) may be a general-purpose computer.

The image processing unit (120) receives information about the position and point of view of the camera (110) from a position tracking device (111). The position tracking device (111) also follows the movement of the camera (110) within the shooting area and the changes in the point of view. These movements may be horizontal movement, raising, lowering, change of orientation (pan/tilt movements) of the camera (110), etc. within the area. The image processing unit (120) also receives the current camera (110) parameters of the camera (110) as input. Said current input parameters may be at least one of lens view angle, lens focal length, lens type, lens deformation information.

The image memory (124) may include the 3D environment image. The processor unit (121) may provide the display of the appropriate images from the image memory (124) on the video wall display (130) at the appropriate time. The images displayed on the video wall display (130) may be controlled by another processor in a possible embodiment of the invention.

Figure 2:
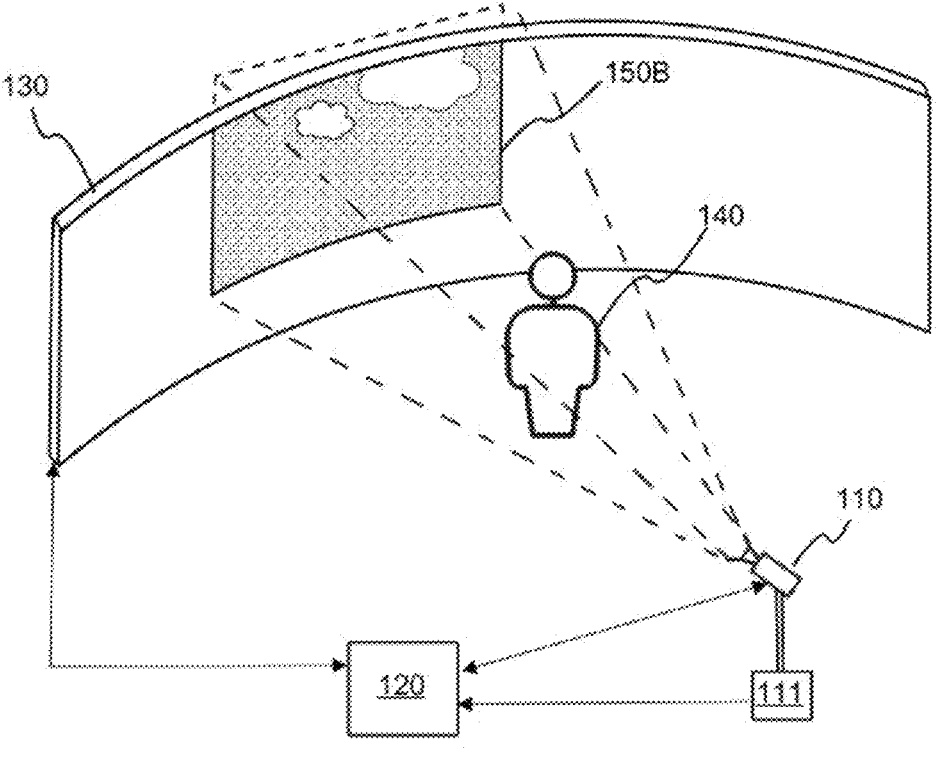

FIG. 2 shows an image acquisition state in which the point of view and field of view of the camera (110) exceed the edge of the video wall display (130). Some portion of the displayed background image (150B) shown is not visible, and the resulting image needs to be edited by the operators by various processes in this case.

Color switching can be made and the portions to be masked can be determined and the background can be completely changed in cases where fixed color or fixed image backgrounds such as green background etc. are used, in case of such overflow. However, mask creation methods such as difference keying cannot be performed since the image and the camera (110) are mobile on the video wall display (130). Instead, operators perform various operations manually to prevent problems such as image shifting in the overflowing portions and the overflowing portion being prominent.

The novelty aspect of the present invention is to provide a method and system that eliminates these overflows. It is ensured thanks to the invention that the portions to be masked in the image captured by the camera (110) are determined and the errors in the background are corrected and the background is changed according to this masking.

When an image is taken without an object (140) in a fixed background, an image is taken with the object (140) in it, and the differences are detected by comparing the image with the object (140) in it and the image without the object (140), the object (140) can be removed from the image, that is, masked, thereby the background can be changed as desired in the present art. The invention allows similar difference keying in this system where both the camera (110) and the background are mobile.

The background image (150A) presented on the video wall display (130) is defined as a displayed background image (150B). The displayed background image (150B) captured by the camera (110) is defined as the captured background image (150C).

Accordingly, the processor unit (121) receives a first image (160) from the camera (110) comprising the object (140) and the captured background image (150C) (i.e. the state of the background (150B) displayed on the video wall display (130) being captured by the camera (130)). The processor unit (121) then detects the displayed background image (150A) at the time the first image (160) is received. A previously calculated lag value can be used to detect this. The detection process can be performed by assuming that an image captured by the camera (110) at time t is produced by the processor unit (121) at time t-x. The x value here can be calculated as a result of the measurements made after the whole system is installed.

The processor unit (121) receives the point of view of the camera (110) and the position of the camera (110) at the time the first image (160) is captured from the position tracking device (111). The processor unit (121) also receives the camera (110) parameters at the time the first image (160) is received from the camera (110) as input. The memory unit (122) also includes the positions and dimensions of the video wall displays (130). This information is recorded as video wall position information. Thus, the processor unit can calculate the distance information of each pixel of the image taken from the camera to the camera (110), the lens of the camera, the light sensor when an image is shown on the video wall display (130). This structure, where the depth value of each pixel is kept, is called a depth map in the art.

The processor unit (121) obtains an edited background image (150D) by converting the detected (created at the time of t-x) background image (150A) into a form viewed by the camera (110) (into an image similar to the captured background image (150C) in which the object does not obscure it) according to the camera point of view and the camera position. The processor unit (121), in other words, obtains the edited background image (150D) by making the orientation of the detected background image (150A) and the effects such as the light in the environment, the lens of the camera, etc. identical to the background image (150) in the first image (160) captured in the camera (110).

A representative view of the interaction of the processor images and the processor unit and the final obtained edited background image (150D) is given in FIG. 5. Consequently, the processor unit (121) obtains the edited background image (150D) in which the optical deformations of a background image (150A) shown on a video wall display (130) (displayed background image (150B)) are simulated when captured by the camera (that is, when it becomes the captured background image (150C)). Thus, it determines the background image (150A), which is the origin of the captured background image (150C), and applies the optical deformations applied by the camera, to this image.

In a possible embodiment of the invention, the processor unit (121) calculates the distance of each pixel of the displayed background image (150B) on the video wall display (130) to the camera/camera lens/light sensor of the camera and makes the detected background image (150A) as viewed by the camera (110) when it is displayed on the screen.

The processor unit (121) then changes the background image (150A) according to the parameters of the camera (110). In other words, the processor unit (121) makes the detected background image (150A) fall into the light sensor by passing through the camera (110) lens when it is displayed on the video wall display (130). The processor unit (121) can subject the background image (150A) to processes such as lens distortion application, turbidity application, focus application. The processor unit (121) may execute an image processing software (123B) to enable these operations to be performed.

In a possible embodiment of the invention, the processor unit (121) calculates the changes between the display and the camera sensor as well as the distance of each pixel of the displayed background image (150B) to the camera/camera lens/camera's light sensor and turns the background image (150A), which is determined to be the origin of this image, into a edited background image (150D) according to said changes. When the video wall position information, camera position, camera point of view and camera and lens parameters information are accessed, it also calculates how these pixels will appear in the camera (110), since it knows the distance of each pixel of the video wall display seen from the camera to the camera (110), and edits the detected background as if it is displayed in the camera (110).

The processor unit (121) determines the portions (152) to be masked in the first image (160) using the edited background image (150D), referring to FIG. 6. The edited background image (150D) may be provided in a second image (161) that is compatible with the first image (160). The second image (161) is edited in a size compatible with the camera point of view. The processor unit (121) preferably performs difference keying. The object (140) and the unwanted portions (151) can be completely separated from the background and the image of the 3D environment model can be added to the object (140) as a background from the desired angles as a result of the difference keying. Therefore, it is ensured that the portions where the camera (110) point of view exceeds the video wall display (130) and the background are replaced with the appropriate image of the 3D environment.

The unwanted portions (151) in the first image (160) may be directly masked in a possible embodiment of the invention. Said unwanted portions (151) are known in the art as garbage masks, and in cases where the camera point of view exceeds the video wall screen (130), the portions other than the video wall screen (130) can be determined as unwanted portions and masked.

The various steps of switching may be performed using artificial intelligence in a possible embodiment of the invention.

The scope of protection of the invention is specified in the attached claims and cannot be limited to those explained for illustration purposes in this detailed description. It is evident that a person skilled in the art may exhibit similar embodiments in light of above-mentioned facts without departing from the main theme of the invention.

What is claimed is:

1. An image processing method carried out by a processor unit configured to input a first image from a camera to determine which unwanted background portions of the first image are to be masked, the method comprising:

receiving, from a position tracking device, a camera position and a camera point of view from which the camera acquired the first image, the first image including at least one object in front of a video wall display and including a captured background image that is the displayed background image as captured by the same camera, accessing a background image that is the source of the displayed background image shown on the video wall display when the camera acquired the first image, creating an edited background image by converting the accessed background image into a form viewed by the camera using positions and dimensions of the video wall display stored in a memory unit, and using together with the camera position and the camera point of view, and applying, to the accessed background image, optical deformations applied by the camera, to generate an edited background image that is the background image as viewed by the camera, and determining the portions to be masked in the first image by performing difference keying between the first image and the edited background image to determine unwanted background portions in the first image.

2. The image processing method according to claim 1, further comprising:

determining the camera parameters of the camera with which the camera acquired the first image prior to the step of determining the portions to be masked, and wherein the applying, to the accessed background image, optical deformations applied by the camera is performed according to the camera parameters.

3. The image processing method according to claim 2, wherein the camera parameters are at least one of lens zoom state, the filter used, lens focus state, lens type, or lens dimensions.

4. The image processing method according to claim 1, wherein the image processing method creates an edited background image according to the distance of each pixel in the accessed background image from the sensor of the camera when creating the edited background image.

5. The image processing method according to claim 1, wherein the background image comprises images in the form of a linear content obtained from a 3D virtual scene model.

6. A system comprising:

a processor unit configured to input an image captured by a camera to determine which unwanted background portions of a first image are to be masked, the first image comprising at least one object in front of a video wall display in which a displayed background image is shown, wherein a position tracking device is configured to send a point of view and position information of the camera to the processor unit, and wherein the processor unit is configured to perform the following steps:

receiving, from the position tracking device, a camera position and a camera point of view from which the camera acquired the first image, the first image including a captured background image that is the displayed background image as captured by the same camera, accessing a background image that is the source of the displayed background image shown on the video wall display when the camera acquired the first image, creating an edited background image by converting the accessed background image into a form viewed by the camera using positions and dimensions of the video wall display stored in a memory unit, and using the camera position and the camera point of view, and applying, to the accessed background image, optical deformations applied by the camera, to generate an edited background image that is the background image as viewed by the camera, and determining the portions to be masked in the first image by performing difference keying between the first image and the edited background image to determine unwanted background portions in the first image.

7. The system according to claim 6, wherein the processor unit is further configured to perform the following steps:

determining the camera parameters of the camera with which the camera acquired the first image, wherein the applying, to the accessed background image, optical deformations applied by the camera is performed according to the camera parameters.

8. The system according to claim 7, wherein the camera parameters are at least one of lens zoom state, the filter used, lens focus state, lens type, or lens dimensions.

9. The system according to claim 6, wherein the processor unit is configured to create an edited background image according to the distance of each pixel in the accessed background image from the sensor of the camera when creating the edited background image.

10. The system according to claim 6, wherein the background image comprises images in the form of a linear content obtained from a 3D virtual scene model.

\* \* \* \* \*